Patented Oct. 5, 1943

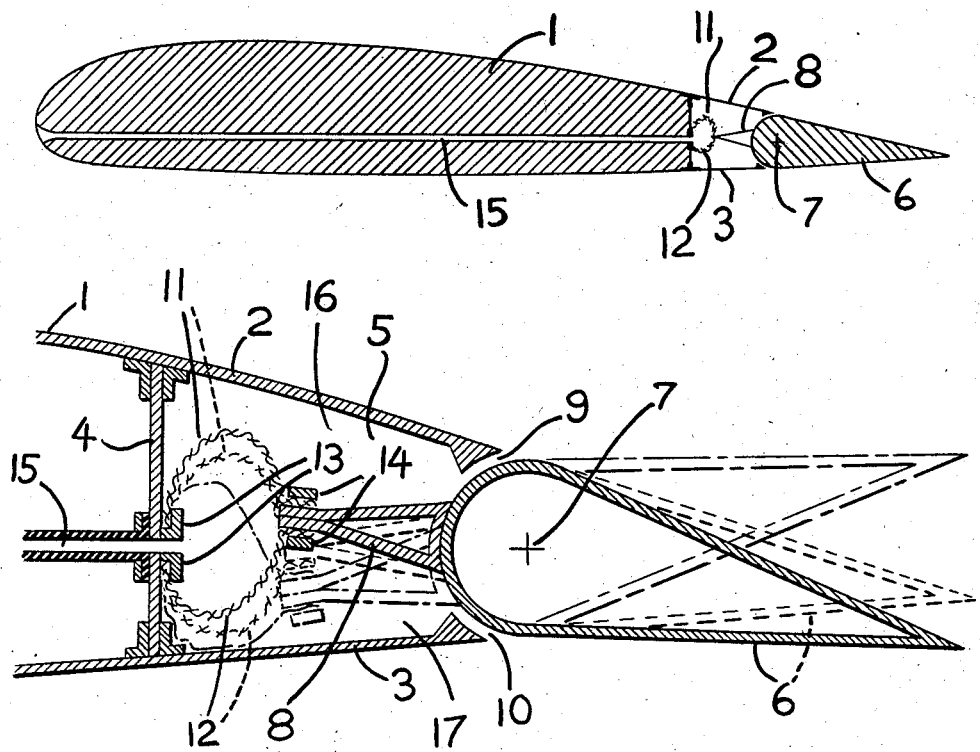

2,331,047

UNITED STATES PATENT OFFICE 2,331,047

BALANCED CONTROL SURFACE

George S. Schairer, Seattle, Wash., assignor to Boeing Aircraft Company, Seattle, Wash., a corporation of Washington Application October 9, 1942, Serial No. 461,482

6 Claims. (Cl. 244—87)

Aerodynamic balances of the submerged type shown in the patent to C. L. Johnson, No. 2,281,696, are known, but their use has been attended with certain difficulties. While the Johnson membrane type of seal between the leading edge portion of the control surface and the forward or bottom wall of the recess which receives it is preferable to the wiping type of seal, as disclosed in the Weick patent, No. 2,239,475, because a tighter seal can be maintained, or to the sliding type of seal as disclosed in the Wagner and von Doepp Patent No. 2,211,870, because of the mechanical complications of the latter, still the single membrane type of the Weick patent is subject to violent fluctuations with change in the pressure relationship as between the upper and lower chambers within the recess. If the sealing membrane is deflected upwardly, due to downward deflection of the control surface and consequent higher pressure in the lower chamber, and if then the pressure difference between the two chambers is suddenly reversed, as by an upward deflection of the control surface, the sealing membrane will move rapidly into the lower chamber from the upper chamber, and will bring up with a shock as it reaches the limits of its movement. In any event this will impose undesirable stresses on the control surface and its controls, and on the membrane itself, and it may set up progressive oscillations to bring about a shimmying condition. Overtravel of the control surface will also result, unless the controls themselves are irreversible.

It is thus seen to be desirable to eliminate such shocks and stresses, and to that end to prevent abrupt changes of position of such a sealing membrane. This is the primary object of the present invention. Other and subsidiary objects will be understood as this specification progresses.

The present invention is concerned with a control surface as part of an airfoil, and with such a control surface which has an aerodynamic balance submerged within a recess in the surface ahead of it, and in particular with provisions for preventing abrupt reversal of the position of the sealing membrane.

In the accompanying drawing my invention has been shown diagrammatically in a typical form of execution.

Figure 1 is a chordal section through an airfoil having such a control surface mounted upon it, and Figure 2 is an enlarged section through the rear edge of such an airfoil and through an associated control surface mounted thereon.

I shall refer herein to a control surface and to an airfoil or fixed surface, or forward support for the control surface, which latter will be the wing in case the control surface is an aileron, or a fixed vertical or horizontal tail surface, in the event the control surface is part of the empennage. At the same time, the forward surface or support may not be in itself fixed, but may be part of an intermediate surface whereon the rearmost or trailing surface is hingedly mounted, and may be itself movable with respect to a forward fixed surface, as, for example, in the patent to E. C. Wells, No. 2,277,378. The invention is illustrated with specific reference to a wing as the forward or fixed surface, and to an aileron as the movable control surface, without any intention, however, of limiting the application of the invention to such specifically named and illustrated surfaces.

The wing 1 is of any desired contour and form of construction, except that at its rear edge its upper skin 2 and its lower skin 3 are spaced apart and define, in conjunction with a transverse partition 4 forwardly of their rearmost edges, a rearwardly opening recess 5.

Adjacent, and usually slightly rearwardly of the entrance to this recess 5, an aileron or like control surface 6 is hingedly mounted, by usual means not necessary to describe, for angular movement about a hinge axis 7, and is supported from the forward surface 1. The control surface is formed with a forwardly projecting nose portion 8, which swings with the control surface 6, and which is received within the recess 5. The recess is of sufficient width, between the skins 2 and 3, and the hinge axis 7 is so located, as to permit swing of the control surface 6 and its nose portion 8 within their intended angular limits. The forward edge of the nose portion 8 stops short of and is spaced to the rear of the partition 4, at the bottom of the recess 5. The control surface itself is spaced from the rearmost edges of the upper and lower skins 2 and 3, respectively, to leave gaps 9 and 10, respectively, by which communication is had between the interior of the recess 5 and the air at the respective sides of the airfoil 1. These gaps 9 and 10 are always open, and as the pressure changes at opposite sides of the airfoil these changes are communicated through these gaps with the interior of the recess 5; if communication between the upper and lower sides of the nose portion 8 is barred, such pressures, of opposite sign when the control surface is deflected, act upon the balance or nose portion 8, tending to assist such deflection of the control surface itself.

All the structural arrangements just described are known practice, and it is known also to complete the seal between the forward edge of the nose portion 8 and the partition wall 4, to bar communication of pressures between the opposite sides of the balance 8, by a flexible membrane which, in cooperation with the balance 8, divides the recess 5 into two non-communicating chambers 16 and 17. In the present instance, however, departing from prior practice, the sealing is effected by two separate membranes 11 and 12. Each of these is joined, as at 13, to the partition or bulkhead 4, and each is joined, as at 14, to the leading edge portion 8. These membranes are formed of flexible material, as cloth, suitably rendered impervious or air-tight by a suitable coating, and each has sufficient slack that the aerodynamic balance 8 may swing between its extreme limits without either membrane becoming taut, and therefore without substantial restriction on the freedom of the balance's movement by reason of the membranes.

These membranes in effect form the opposite walls of a sleeve which is connected along its forward edge to the partition 4, and along its rear edge to the leading edge portion or aerodynamic balance 8. If, then, this sleeve can be maintained in a distended condition it will in effect roll along the partition 4 as the balance 8 swings upwardly or downwardly. The sleeve may be maintained distended in any suitable fashion, and speaking generically, it is maintained distended by a yieldable medium enclosed within it to separate its sides 11 and 12, and to roll as the balance 8 swings. The distending medium thus may be a tangible stuffing, but preferably is a pressure fluid, such as air under some pressure.

The source of pressure fluid for distention of the sleeve may be any suitable source, such as the cabin or engine supercharger, deicer pressure source, or any convenient air scoop. Such source communicates with the interior of the sleeve by means of the duct or ducts 15. However, since the sleeve need be distended only under operative conditions the pressure source may be conveniently the pressure zone existing at the leading edge of the airfoil 1, and to that end, as seen in Figure 1, the duct 15 communicates with the nose of the airfoil 1. The upper chamber 16 or the lower chamber 17, depending upon conditions and the position of the control surface 6, will be a plus pressure chamber as related to the other, but in any event the pressure at the leading edge of the airfoil 1 will be higher than the pressure in the higher pressure chamber 16 or 17; therefore the sleeve will be maintained distended, notwithstanding the pressure in the higher pressure chamber within the recess 5.

It can be seen that the operation of the seal is automatic. The sleeve consisting of the separate membranes 11 and 12 may collapse when the airplane is at rest. As soon as pressure develops at the nose of the airfoil 1 this pressure is communicated by way of the duct or ducts 15, for there may be several of them throughout the length of the sleeve, and the sleeve is distended. Now when the control surface 6 is swung angularly, for instance from the neutral position shown in dash lines in Figure 2 to the slightly downwardly deflected full-line position, the membranes 11 and 12 will likewise be deflected upwardly and downwardly, respectively, but will still remain distended. If either of them contacts with the partition 4 it will merely in effect roll thereover. If now the control surface 6 should be quickly deflected upwardly above its neutral position, as shown in dot-dash lines, thereby reversing the pressure relationship and making the chamber 16 the higher pressure chamber, the only effect will be to deflect the respective partitions, which still project upwardly and downwardly, respectively, and to cause them in effect to roll over the partition 4. Neither one of them reverses its position or its direction of deflection, because each one is maintained distended by the pressure within the sleeve. The result is, the seal is always maintained, to maintain a separation of pressure as between the chambers 16 and 17, yet by no possibility can the sealing membranes produce any sudden force tending to affect the operation of the control surface, or tending to destroy the membranes themselves.

There is a further effect noted, if the proportions of the membranes 11 and 12, and their shape in relation to the surfaces they roll over, be chosen in a manner to produce it. Obviously, if the two membranes are of equal area, and neither receives any backing from structure such as the partition 4, the pressure within the sleeve which acts outwardly or upwardly on the membrane 11, and which therefore produces a torque acting on the balance 8 to swing the latter upwardly, is precisely counterbalanced by the internal pressure acting downwardly on the membrane 12. If it should be desired to bias the balance 8 in one direction, that can be done by decreasing the unsupported area of one or the other of the membranes 11 or 12. The most likely use of this principle would occur towards the limits of deflection of the balance 8 and control surface 6, when it might be desired to produce an increasing resistance to further deflection, to retain the "feel" of the controls. As the control surface is deflected upwardly, into the dot-dash position, the lower membrane 12 is increasingly supported by the partition 4 and lower skin 3, and its effective area exposed to internal pressure is lessened. The pressure area of the upper membrane 11 remains unchanged. The internal pressure within the sleeve therefore produces an upward resultant acting to increasingly resist downward swinging of the aerodynamic balance 8. This effect, of course, is quite distinct from the aerodynamic forces acting upon the balance 8, which in such a case urge it downwardly.

The balance 8 has been referred to as an aerodynamic balance. To a certain degree it functions also as a static balance, and the degree to which it does so can be controlled by weighting it more or less, as in the Johnson patent referred to above. Whether or not it functions also as a static balance is immaterial, so far as the present invention is concerned. The sleeve will need to add but little to the static torque acting upon the leading edge portion 8, although this can be controlled and varied also, by selection of heavier materials, or by enclosing weighting material, perhaps as stuffing, within the sleeve.

What I claim as my invention is:

1. In combination with an aircraft control surface and a support forward thereof, said support having a rearwardly opening recess, and said control surface being hingedly mounted at and spaced from the entrance to said recess, an aerodynamic balance projecting forwardly from said control surface into said recess, and swingable with the control surface, a sleeve joining the support, at the bottom of the recess, with the aerodynamic balance, and cooperating with the latter to divide the recess into two non-communicating chambers of inversely variable size, and means to distend said sleeve under operative conditions.

2. The combination of claim 1, wherein the sleeve-distending means comprises means communicating with the interior of the sleeve to supply a pressure fluid thereinto.

3. The combination of claim 1, wherein the sleeve-distending means comprises a duct affording communication between the interior of the sleeve and a high pressure zone adjacent the nose of the support.

4. In an aircraft, an airfoil comprising, in combination, a forward surface having a rearwardly opening recess, a trailing surface formed with a forwardly projecting nose portion, and hingedly mounted upon the forward surface with its nose portion extending within said recess, the trailing surface being spaced from and disposed between the rear edges of the recess, and substantially faired into the contours of the forward surface to form a continuation thereof, and said nose portion being spaced rearwardly from the bottom of the recess, two flexible impervious membranes connecting and sealing the nose portion of the trailing surface to the bottom of the recess, whereby to divide the recess into two chambers each communicating with one surface of the airfoil through the spacing between the rear edges of the recess and the trailing surface, said membranes having sufficient slack to permit swinging movement of the trailing surface throughout its intended range, and means to supply a pressure fluid, under all operative conditions, between the two membranes, to separate and distend them.

5. Means for balancing torques acting on control surfaces of aircraft or the like, comprising in combination a forward airfoil terminating rearwardly in two spaced edges and a rear partition ahead thereof defining a rearwardly opening recess, a trailing control surface arranged for oscillation to the rear of said airfoil, and formed with a forwardly projecting nose received within said recess, but terminating to the rear of said partition, and sealing means extending between said nose and said partition in all operative positions, and cooperating with said nose to divide the recess into two non-communicating chambers, said sealing means being formed and arranged to extend simultaneously into each such chamber, and to roll over the partition as it is moved by oscillation of the control surface and its nose, and said control surface being located in spaced relation to the rear edges of the recess, whereby the two chambers communicate with the air adjacent the airfoil.

6. An airfoil, a control surface forming a trailing portion of said airfoil, and being mounted for angular movement relative thereto for control, said airfoil providing a recess therewithin having a forward wall, the leading edge portion of said control surface extending forwardly into said recess, two separate flexible membranes each attached to the leading edge portion of said control surface and each extending forwardly therefrom in an uninterrupted manner through and across said recess to said forward recess wall, and having sufficient slack to permit unimpeded angular movement of the control surface throughout its intended range, the leading edge portion of said control surface and said membranes cooperating to divide said recess into separate chambers at opposite sides, respectively, of said leading edge portion and said two membranes, said separate chambers being in communication with the exterior of the airfoil at opposite sides, respectively, of the airfoil, whereby there is established in each chamber an air pressure condition corresponding to the air pressure condition at that side of the airfoil with which either given chamber is in communication, and the leading edge portion of the control surface and the membranes within said recess are subjected to differences in pressure in the chambers at opposite sides thereof, and means to maintain the space between said membranes, under operative conditions, under pressure in excess of pressure obtaining within the higher pressure chamber of said recess'

GEORGE S. SCHAIRER.